Figure 1:
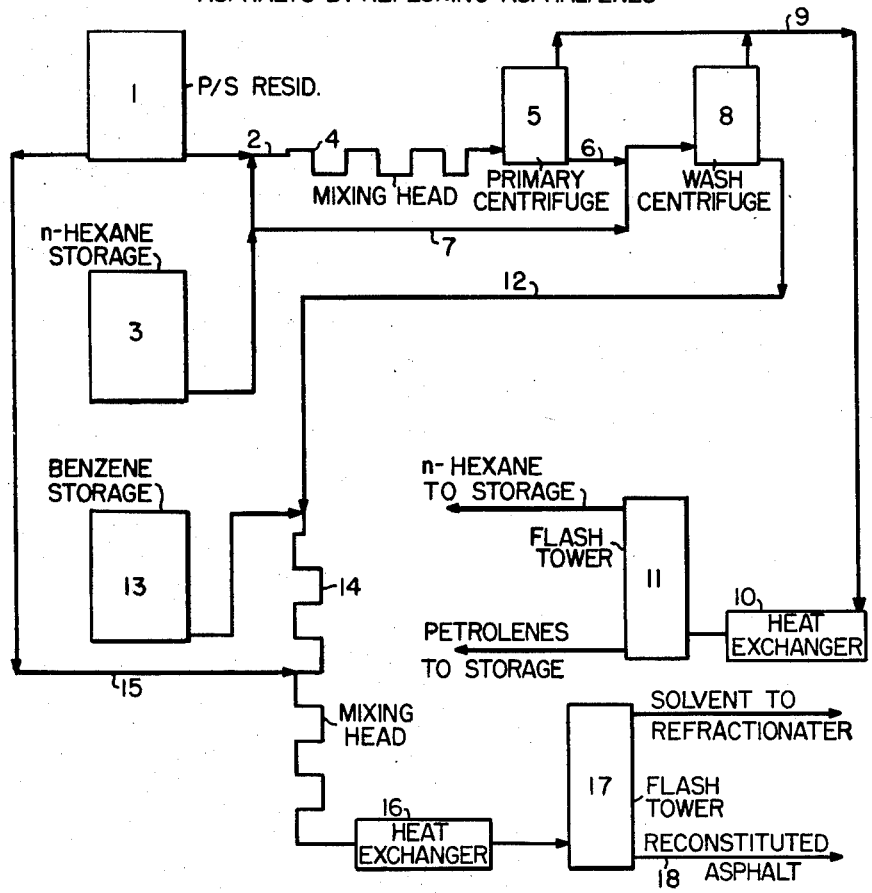

METHOD FOR RECONSTITUTING
ASPHALTS BY REFLUXING ASPHALTENES

Luke W. Corbett
Clark E. Adams      Inventors
Glen P. Hamner

By Richard W. Nagel

Patent Attorney

ASPHALTENE RECONSTITUTED ASPHALTS ARE INTERMEDIATE
TO THOSE PREPARED BY AIR BLOWING AND STRAIGHT REDUCTION

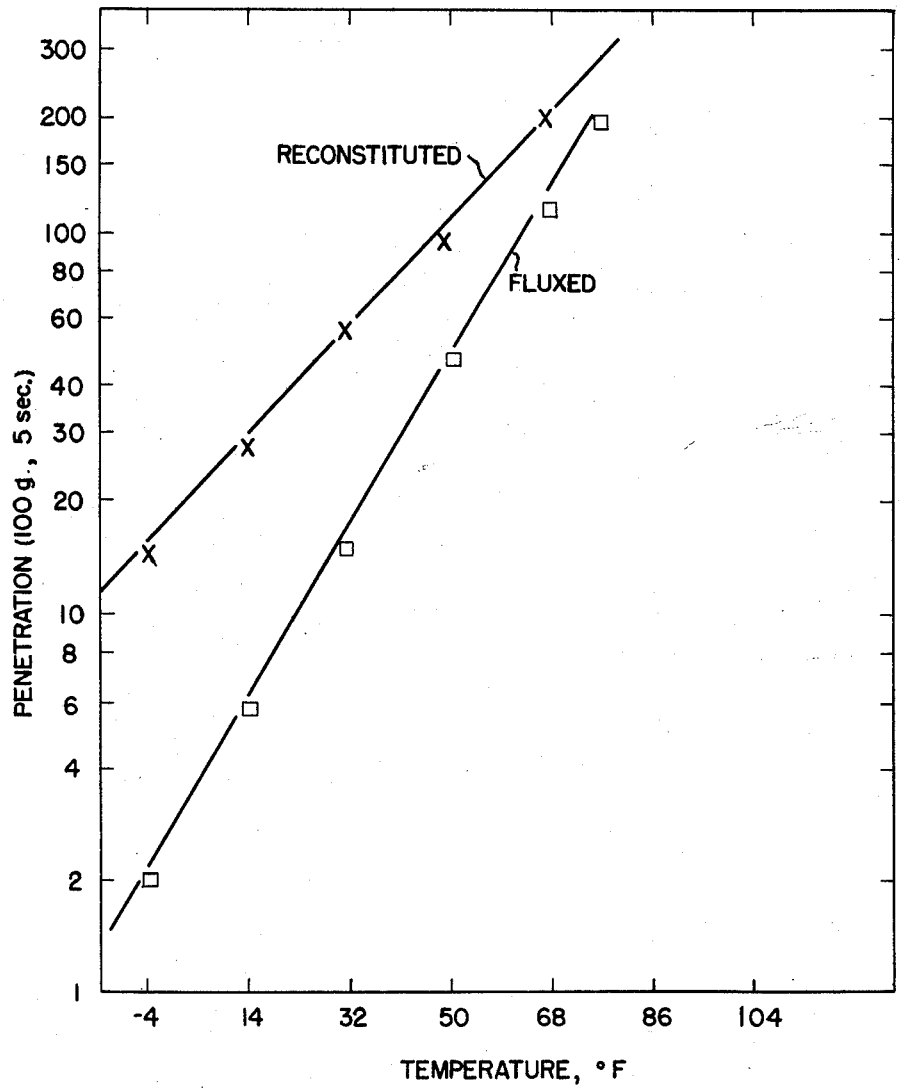

3,087,887
METHOD FOR MANUFACTURING OF SPECIFICATION PAVING AND INDUSTRIAL ASPHALTS
Luke W. Corbett, Westfield, N.J., and Clark Edward Adams and Glen Porter Hamner, Baton Rouge, La., assignors to Esso Research and Engineering Company, a corporation of Delaware
Filed Dec. 21, 1959, Ser. No. 860,857
8 Claims. (Cl. 208—45)

This invention relates to a new and improved method of making asphaltic compositions. More specifically, the invention teaches the adding of extraneous asphaltenes into asphalt to improve its properties.

In the past and presently, two methods are employed to produce high quality asphalts which are needed for road paving and other applications where high constancy is of the essence. One method involves a two-stage distillation operation. Ordinarily, the first stage is a conventional steam distillation performed in an atmospheric pipe still to remove the bulk of the light fractions from the crude. The second stage, needed to further concentrate the heavy constituents, is a vacuum distillation, with or without the presence of steam. Air blowing of pipe still residuum is the second method used currently. In the latter process the aromatic oils are chemically converted to asphaltenes by oxidation. Both of the above methods have significant drawbacks. The first requires the costly second stage vacuum distillation. This operation requires the expenditure, conservatively estimated, of from 15 to 20¢ per barrel in addition to equipment costs.

In the vacuum process, the percent of asphaltenes is increased by concentration, whereas in the air blowing process, the percent of asphaltenes is increased by conversion from aromatic oils. This increase in percent asphaltenes is largely responsible for the increase in consistency of the resulting asphalt product.

In the manufacture of heavy fuel oils, it is common practice to visbreak a residual stock in order to meet lower viscosity requirements. This in essence is a mild form of cracking or heat soaking which has a tendency to thermally crack both asphaltenes and oils to make the less viscous product desired to meet fuel specifications. Since asphaltenes are largely responsible for high consistency or viscosity, it is working at cross purposes to make asphaltenes in one process to increase consistency while visbreaking in another to reduce this.

Asphalt-bearing crudes normally contain from 4 to 12% by weight of asphaltenes. Since there is a greater excess of asphalt crudes than of non-asphaltic crudes, there exists an ever abundant source of asphaltenes.

There is also a demand for large volumes of heavy fuel oils which must be made by visbreaking or by dilution with more valuable lighter petroleum oils. This offers the opportunity to divert asphaltenes to asphalt applications where consistency is desired and to free deasphaltened oil (petrolenes) for other uses such as in heavy fuels.

In the case of specialized industrial asphalts, specific advantages may be obtained over the conventional air blown asphalts. For example, the blended asphalts have improved ductility and staining properties. In paper laminating asphalts stain is of utmost significance.

In accordance with this invention, it has been found that an asphalt having properties comparable to those produced by conventional process and, in some respects even better, is obtained by adding or blending an extraneous asphaltene fraction into a residuum. Briefly, this process consists of deasphaltening a particular residuum, i.e. removing the asphaltenes, and subsequently refluxing the asphaltenes into the same or different residuum.

The percentage of asphaltenes added varies from 2 to 50% by weight. With an average residuum, it takes at least 2% to accomplish any effective increase in consistency. For paving, the addition is normally on the order of from 5 to 15% to obtain an asphalt of the proper consistency. For certain industrial asphalts, the addition is of the order of 10 to 50% depending upon the product desired. The products to which over 50% have been added are normally of such a high softening point that they are unsuitable for most applications.

FIGURE 1 illustrates a preferred process of obtaining asphaltenes and their subsequent blending with residuum.

Figure 2:
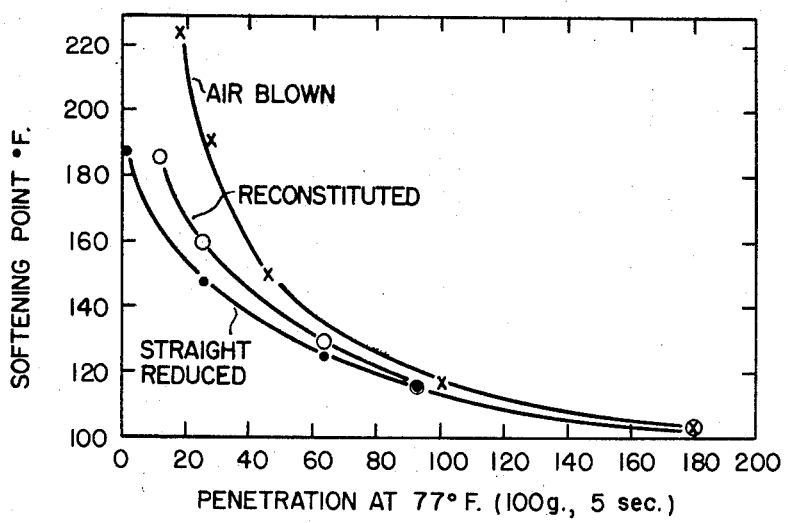

FIGURE 2 graphically compares the penetration-softening point relation between the asphalt blend of the invention with both air blown and straight reduced asphalt.

FIGURE 3 shows the temperature susceptibility of the asphalt blend and asphalt fluxed with the same base.

Turning now to FIGURE 1, pipe still residuum from Tia Juana medium crude (35% by volume on crude) kept in storage 1 is pumped through line 2 while normal hexane from storage 3 is pumped into the same line. The mixing ratio is preferably 5.0 solvent to oil by volume, although this may vary from 3.0 to 25.0. The lower ratios are preferred from the practical volume handling standpoint although higher ratios permit greater selectivity. Other solvents such as pentane, isopentane, normal heptane, isooctane, or other paraffin type pure or mixed solvents may also be used. As soon as the residual stock is contacted with the solvent in this ratio, the asphaltenes are deflocculated, that is, the asphaltene-oil phase colloid is broken up by virtue of dilution. The mixture then passes through a mixing head 4 or some other suitable continuous mixing device and thence into a continuous type high speed centrifuge 5. A centrifuge suitable for this purpose is a Sharples Nozzlejector type DH-2 which is capable of handling up to 3000 gallons per hour of charge. For greater capacities a battery of centrifuges may be used. The asphaltene-hexane slurry is rejected from the centrifuge and consists of approximately equal volumes of asphaltenes and hexane-oil. The slurry is then further diluted with additional hexane through line 7 to a solvent to asphaltene ratio of about 4.0. This mixture is then passed into the wash centrifuge where a second separation is made. The asphaltenes are again rejected in about a 1.0 ratio and moved into line 12 for further processing. The combined solvent-petrolene oil mixtures are continuously passed through a heat exchanger 10 and to a flash tower 11 for stripping. The petrolenes are thus recovered as a residual product, and the solvent is returned to storage for reuse.

The asphaltene slurry passing through line 12 is then mixed with benzene from storage 13 and into a mixing head 14 in a volume ratio of about 3:1, slurry to benzene. this causes solution of the asphaltenes in the solvent mixture. After a small amount of mixing, a fresh charge of residuum is mixed continuously with the asphaltene-benzene-hexane mixture through line 15. The higher temperature of the residuum from storage imparts a higher temperature to the above mixture (100 to 150° F.) thus affecting better solution and mixing. In this example the same Tia Juana residuum was used, however, as previously stated, this residuum may be another stock depending upon the end product desired. The proportion of the residual stock to the slurry also depends upon the end product desired as will be brought out in blending data to follow. Solution is effected during mixing after which the mixture is passed into a heat exchanger 16 and then to a flash tower 17. The solvent is thus refractionated and the blended asphalt recovered through line 18 as the flash tower residuum. It has also been demonstrated by laboratory blending and stripping that other solvents can be used in place of benzene to facilitate the mixing of asphaltenes. For example, the same net result can be obtained by using straight run petroleum naphtha boiling between 300° and 400° F., other paraffinic distillates, and other aromatic solvents such as xylene, toluene and mixtures thereof. Solvents may also be of an origin outside crude petroleums, e.g. those obtained from coal carbonization processes. The only requirements of the solvent are that it must have sufficient solvent power for asphaltenes, and have a sufficiently low boiling point to permit fractionation from the reconstituted asphalt.

It is also possible to incorporate the asphaltenes into asphalt by mixing without a solvent. This method avoids the necessity of removing the solvent from the blend. However, this procedure requires very high temperatures and additional power for mixing.

Alphaltenes, a solid, infusable, brown-black material having a specific gravity of about 1.15 to 1.25, may be defined as that portion of a residuum which is insoluble in petroleum solvents that are composed entirely of open-chain hydrocarbons with a gravity of 86 to 88° Baumé, and at least 85% of whose constituents boil between 95° and 150° F. Pure solvents such as n-pentane, n-hexane, n-heptane and isooctane accomplish essentially the same separation and have the advantage of uniformity of solvent composition. See also Abraham, Asphalt and Allied Substances, D. Van Nostrand Co., New York (1945), pp. 71 and 1165.

The following examples further show the advantages of the instant invention.

EXAMPLE 1

A Tia Juana crude flux residuum was air blown at 450° to 500° F. by conventional techniques; a series of products were obtained at different times of blowing. The tested softening points were plotted against the penetration of the successive products yielding the curvilinear relationship shown in FIGURE 2. The same flux or residuum was reduced by vacuum distillation to various levels of hardness (which varies with the temperature and processing rate), obtaining products of varying softening point and penetration. The curve from this relationship was then plotted as shown by the line marked "straight reduced" in the same figure. By taking the same original residuum or flux and blending it to contain increasing amounts of extraneous asphaltenes, a third relationship was obtained as shown by the curve marked "reconstituted." The technique used for manufacturing this asphalt was the same as that previously described. Table I shows properties of the asphalts produced by the three methods.

The properties of the asphalts produced are illustrated clearly in FIGURE 2 and the data below:

The data illustrate how the blended asphalts are intermediate in such properties as low temperature penetration susceptibility, penetration index, ductility and stain. It will be noted that the blended asphalts are less susceptible to temperature than straight reduced while having satisfactory ductility for paving. All the reconstituted asphalts were negative to the Oliensis spot test (Standard Test Method T102–42, American Association of State Highway Officials), which indicates satisfactory homogeneity. The column showing percent asphaltenes over flux in Table I represents the difference in asphaltene percentage of this product compared with the base flux or original residual stock. The air blown asphalts contain more asphaltenes at a given penetration level compared with reconstituted and straight reduced. It will also be noted that the asphaltene content of the reconstituted asphalts approach the composition of the blown asphalt and is definitely higher than the straight reduced. The improved ductility and staining properties as compared to conventional air blown asphalts is also clearly shown in Table I.

EXAMPLE 2

As to industrial asphalts such as under Federal Specification SS–A–666 which covers purchases made through the Federal Standard Stock Catalog, the blended asphalts pass those specifications normally made by air blown asphalts.

Type I asphalt as shown below may be prepared by blending a Tia Juana flux (containing 13% by weight of asphaltenes) with asphaltenes to bring its content up to 25%. Type II can be prepared by the same process to obtain a product of 28% asphaltenes. Type III is a product of 27% asphaltenes.

*Table I*

| Penetration @ 77° | Process | Penetration @ 32° | Penetration @ 39.2° | Softening point | Penetration index | Ductility @ 77° | Barber stains | Percent Asphaltenes over flux |
|---|---|---|---|---|---|---|---|---|
| 92 | Air Blown | 32 | 42 | 120 | 0.2 | 100+ | 2½ | 8.5 |
| 92 | Blended | 28 | 41 | 118 | −0.2 | 100+ | 2 | 7.0 |
| 92 | Straight reduced | 26 | 39 | 118 | −0.2 | 100+ | 2 | 2.6 |
| 65 | Air Blown | 28 | 40 | 135 | 1.2 | 18 | 3 | 10.5 |
| 65 | Blended | 23 | 31 | 127 | 0.2 | 83 | 2 | 9.0 |
| 65 | Straight Reduced | 21 | 30 | 125 | −0.1 | 100+ | 2 | 4.0 |
| 25 | Air Blown | 13 | 17 | 190 | 3.7 | 3.5 | 3½ | 18.5 |
| 25 | Blended | 10 | 13 | 156 | 1.1 | 6.0 | 2 | 16.3 |
| 25 | Straight Reduced | 10 | 13 | 147 | 0.2 | 50 | 2 | 5.6 |

*Table II*

| | Type I | | Type II | | Type III | |
|---|---|---|---|---|---|---|
| | Specification | Blended | Specification | Blended | Specification | Blended |
| Softening Pt., °F | 140–165 | 145 | 150–165 | 153 | 140–171 | 151 |
| Penetration: | | | | | | |
| @ 77° F | 25–50 | 40 | 20–50 | 30 | 25–50 | 31 |
| @ 32° F | 10+ | 13 | 10+ | 11 | 10+ | 12 |
| @ 115° F | | | 100− | 90 | 100− | 95 |
| Ductility @ 77° F | 5+ | 50 | 4+ | 15 | 15+ | 20 |
| Usage | Surfaced Flat Built-up Roof | | Unsurfaced Built-up Roof | | Waterproofing, Dampproofing | |

EXAMPLE 3

To prove the adaptability of the invention to another crude and to interchange the asphaltenes between base stocks, additional blends were made. Here it will be noted that negative spot asphalts can be blended by use of asphaltenes from air blown asphalt as well as from different crude sources. The asphalts in these examples fall within paving grades specification in some cases and in the lighter industrial grades in others.

*Table III*

| Flux from crude | Asphaltenes from— | Softening point, °F. | Penetration @ 77° | Penetration @ 32° | Ductility @ 77° | Oliensis spot | percent Asphaltenes over flux |
|---|---|---|---|---|---|---|---|
| Lagunillas | Lagunillas | 134 | 47 | 18 | 100+ | Neg | 12.3 |
| Do | Tia Juana | 116 | 95 | 31 | 100+ | Neg | 6.0 |
| Do | ___do___ | 137 | 43 | 15 | 92 | Neg | 13.0 |
| Tia Juana | ___do [1]___ | 129 | 57 | 18 | 100+ | Neg | 10.5 |

[1] From 220° F. blown coating asphalt.

EXAMPLE 4

This example clearly shows how temperature susceptibility may be improved by blending with asphaltenes. The fluxed asphalt contains 85% of 10 penetration propane precipitated base asphalts and 15% Middle East lube distillate. This composition was compared with a blended asphalt containing 25% asphaltenes, 25% base asphalt and 50% lube distillate which was made to approximately the same penetration at 77° F.

Of the two asphalts, the blended one contains a slightly higher percentage of asphaltenes. Quite noticeable, however, is the better penetration temperature susceptibility as shown in FIGURE 3. This shows that blending is possible by use of other stocks from other crudes and that improvement in physical properties may also be obtained.

EXAMPLE 5

That blending of asphaltenes yields a product superior to that obtained by blending other similar materials is shown by the following data. Propane precipitated asphalt was blended with Tia Juana medium flux to obtain a product having penetrations at 77° F. of 92, 65 and 25. These blends were then tested for penetration at 32°, penetration at 39.2°, softening point and penetration index. The following table shows the data obtained.

*Table IV*

| Penetration @77° F. | Process | Penetration @32° | Penetration @39.2° | Softening point, °F. | Penetration index |
|---|---|---|---|---|---|
| 92 | Blend Flux with Propane Precipitated Asphalt. | 22 | 34 | 113 | −1.0 |
| 65 | | 17 | 26 | 122 | −0.6 |
| 25 | | 7 | 11 | 143 | −0.2 |

By comparing the results in this table with those shown in Table I it is apparent that an inferior product is obtained. In all cases both the penetration at 32° and that at 39.2° are considerably less than that obtained with the blended asphalt or for that made with the asphalt obtained by the conventional processes. Likewise the softening point for each of the penetrations is inferior to that obtained with the other asphalts shown in Table I. On all counts the susceptibility of the propane-deasphalted blend is poorer than that of the straight reduced, the most unsatisfactory of the three.

By following the teaching of the instant invention, certain industrial asphalts now made by air blowing, along with certain paving asphalts now made with two stage reduction methods or by semi-blowing, may be replaced. In essence, the desired increase in consistency can be obtained by adding asphaltenes rather than distilling off volatile oils or converting heavy aromatic fractions by air blowing.

The above examples are only illustrative of the instant invention and should not be construed as definitive.

What is claimed is:

1. A process for preparing an improved asphalt which process comprises contacting a petroleum fraction containing asphaltenes with a liquid paraffin into which said asphaltenes precipitate as solids, separating said asphaltenes from said fraction slurried in said liquid paraffin, separating said asphaltenes from said paraffin, admixing said asphaltenes with a hydrocarbon solvent, blending the resulting solution of asphaltenes with an asphalt residuum containing both asphaltenes and petrolenes and separating said hydrocarbon solvent from the resulting improved asphalt, said solution of asphaltenes being blended with said asphalt residuum in an amount such that the asphaltenes added to said asphalt residuum comprises about 2 to 50 wt. percent of said improved asphalt.

2. A process in accordance with claim 1 wherein said hydrocarbon solvent boils at a temperature below about 400° F.

3. A process for preparing an improved asphalt which process comprises contacting an asphalt residuum containing both petrolenes and asphaltenes with a liquid paraffin into which said asphaltenes precipitate as solids, separating said asphaltenes from petrolenes slurried in said liquid paraffin, separating said asphaltenes from said liquid paraffin, dissolving said asphaltenes in a single ring aromatic solvent, blending the resulting solution of asphaltenes with an asphalt residuum containing both petrolenes and asphaltenes and separating said aromatic solvent from the resulting improved asphalt, said dissolved asphaltenes being blended with said asphalt residuum in an amount such that the resulting added asphaltenes comprise about 2 to 50 wt. percent of said improved asphalt.

4. A process in accordance with claim 3 wherein said solvent is benzene.

5. A process in accordance with claim 3 wherein said added asphaltenes comprise 5 to 15 wt. percent of said improved asphalt.

6. A process in accordance with claim 3 wherein said liquid paraffin is hexane.

7. A process in accordance with claim 3 wherein said solid asphaltenes are separated from said petrolenes by centrifuging.

8. A process for preparing an improved asphalt which process comprises admixing a liquid paraffin containing 5 to 8 carbon atoms per molecule with a first asphalt residuum containing asphaltenes and petrolenes, precipitating solid asphaltenes into said liquid paraffin, separating a slurry of said asphaltenes in said liquid paraffin from said first asphalt residuum, separating said asphaltenes from said liquid paraffin, admixing said asphaltenes with a single ring aromatic solvent, blending said asphaltenes and said aromatic solvent with a second asphalt residuum containing both asphaltenes and petrolenes and separating said aromatic solvent from the resulting blend, the asphaltenes added to said second asphalt residuum by said blending being of an amount such that they comprise 2 to 50 wt. percent of said resulting blend.

References Cited in the file of this patent

UNITED STATES PATENTS

| | | |
|---|---|---|
| 2,131,205 | Wells et al. | Sept. 27, 1938 |
| 2,862,869 | Illman | Dec. 2, 1958 |
| 2,940,920 | Garwin et al. | June 14, 1960 |

FOREIGN PATENTS

| | | |
|---|---|---|
| 800,144 | France | Apr. 20, 1936 |
| 766,452 | Great Britain | Jan. 23, 1957 |

OTHER REFERENCES

Ellis: "Chemistry of Petroleum Derivatives," vol. II, page 1201, Reinhold Pub. Co., 1937.